United States Patent [19]

Dimitrov et al.

[11] Patent Number: 4,997,468
[45] Date of Patent: Mar. 5, 1991

[54] APPARATUS FOR DECORATING GLASS AND CERAMIC ARTICLES

[75] Inventors: Dimiter A. Dimitrov; Mincho S. Dakov, both of Plovdiv; Dancho T. Tonchev, Sofia; Hristo A. Kalafirov, Markovo; Todor S. Botev; Krassimir E. Shterev, both of Plovdiv; Vladimir S. Kojuharov; Yordan I. Dimitrov, both of Sofia; Dimiter V. Tsvetkov, Varna, all of Bulgaria

[73] Assignee: PU "Paissii Hilendarski", Plovdiv, Bulgaria

[21] Appl. No.: 497,493

[22] Filed: Mar. 22, 1990

Related U.S. Application Data

[62] Division of Ser. No. 338,959, Apr. 14, 1989.

[30] Foreign Application Priority Data

May 27, 1988 [BG] Bulgaria .................................. 84291

[51] Int. Cl.$^5$ .......................... C03C 23/00; B44C 1/22
[52] U.S. Cl. ....................................... 65/160; 65/174; 65/112; 65/105; 219/121.68; 219/121.69; 219/121.82
[58] Field of Search ................... 65/160, 174, 112, 31, 65/30.1, 102, 105; 219/121.82, 121.67, 121.68, 121.69, 121.74

[56] References Cited

U.S. PATENT DOCUMENTS

| | | | |
|---|---|---|---|
| 3,629,545 | 12/1971 | Graham | 219/121.82 |
| 3,632,205 | 1/1972 | Marcy | 219/121.82 |
| 3,663,795 | 5/1972 | Myer | 219/121.82 |
| 3,701,880 | 10/1972 | Rively | 65/174 |
| 3,786,224 | 1/1974 | Heywang | 219/121.68 |
| 3,986,767 | 10/1976 | Rexer | 219/121.79 |
| 4,081,654 | 3/1978 | Mracek | 219/121.82 |
| 4,328,410 | 5/1982 | Slivinsky | 219/121.68 |
| 4,406,939 | 9/1983 | Golker | 219/121.68 |
| 4,478,677 | 10/1984 | Chen | 219/121.69 |
| 4,825,032 | 4/1989 | Duncan | 219/121.82 |

Primary Examiner—Kenneth M. Schor
Attorney, Agent, or Firm—Herbert Dubno

[57] ABSTRACT

The method for decorative processing is performed with repetitively pulsed cross discharge at atmospheric pressure by $CO_2$-laser with pulse energy 1 to 5J, power density at operation from $1.10^6$ W/cm$^2$ to $6.10^7$ W/cm$^2$, pulse duration from 50 to 100 ns and average power 1 to 1000W whereby the mated area with one shot is from 0.5 to 2 cm$^2$.

The device for laser engraving comprises a base with mounted console, on which are fastened parallel elements and a screw that is seated in its upper end in a thrust and in its lower end it is linked by a hinge to an electric motor. There is a fork which is seated in parallel elements whereby to this fork by means of handle and fixator is fastened a slide with longitudinal channels and a plate for axial inclination per 15°. To this slide is fastened a second electric motor, and on its axis is mounted a bearer on which is fastened a mask in which is fixed the item to be decorated. On the rotating bearer is fastened a disk on which are mounted 4 spokes with 4 springs and a replaceable stand.

2 Claims, 3 Drawing Sheets

APPARATUS FOR DECORATING GLASS AND CERAMIC ARTICLES

Cross Reference to Related Application

This application is a division of Ser. No. 338,959 filed April 14, 1989.

FIELD OF THE INVENTION

The invention relates to a method of and an apparatus for decorative processing of glass, ceramic and articles made therefrom using a $CO_2$ laser.

Two basic methods are known for decorative processing of glass, ceramic and articles made therefrom by means of a $CO_2$ ($\lambda = 10.6$ $\mu$m)-laser (Patent GB 1,294,359; Sklar a Keramik, Rochik—33/1983, 171–175; Sklar a Keramik, Rochik —3,411,984, 157–169; Silikattechnik—35/1984/ Vol. 2, 54–56; Silikattechnik—35/1984/ Vol. 5, 146–148).

In a first method the laser beam reaches the items though openings in a metal mask in which is cut the requested pattern. A drawback of this method derives from the difficult problem associated with the durability of metal masks (Sklar a Keramik, Rochik—33/1983, 171–175; Silikattechnik—35/1984/ Vol. 5, 146–148). The second method provides that the laser beam reach the glass at intervals of a duration controlled by an eternal circuit breaker, e.g. a diaphragm that is controlled by an electric signal or an optical electric scanner. The controlling signal might act on the optics, on the article or otherwise to change the radiation power.

The disadvantage of this method is the reduced production yield for complicated decorations due to the need to scan point to point, the complexity of the equipment and the software used (Patent GB 1,294,359; Sklar a Keramik, Rochik—33/1983, 171–175; Sklar a Keramik, Rochik—34/1984, 157–169).

A known device for laser engraving (P. Urbanek, Laser Decoration of Glass, J. Noncrystal. Sol. 38–39 (1980), page 891) has a base with a console mounted thereon and in which are fastened parallel elements and a screw that is seated at its upper end in a thrust element while at its lower end it is hinged to an electric motor. A second electric motor through a toothed wheel drives the screw with a rotary movement.

The disadvantages of this known device for laser engraving are that there is no possibility for operation in a periodical rotatory-reciprocating mode and that it is impossible to decorate inner parts of articles with flat or quasi-flat geometry. This is because the axis of rotation of the decorated article is always vertical and coincides with the axis of reciprocating vertical movement and because it is impossible to use a simple reflecting and focusing optical system.

OBJECT OF THE INVENTION

The object of the invention is to provide a method and an apparatus for the decorative processing of glass and ceramic articles so as to reproduce repeatedly complicated images whereby the device has the possibility to operate in a sector mode; to permit decoration of the inner parts of articles with a quasi-flat or flat geometry; and to use a simple reflecting and focusing optical system for decorating.

SUMMARY OF THE INVENTION

This object is attained by providing a method using a repetitively-pulsed (RP), transverse discharge at atmospheric pressure of a (TEA) $CO_2$ laser with a pulse energy 1 to 5 J, a power density in processing from $1.10^6 W/cm^2$ to $6.10^7 w/cm^2$, a pulse duration from 50 ns to 100 ns, a repetition frequency from 1 to 500 Hz and an average power 1 to 1000W and a metal mask with photolithographically reproduced image by means of a raster carrying structure.

The mask is made of copper or brass with thickness 0.1 to 0.9 mm that is polished to form a mirror for 10.6 m beam so that the laser beam with a cross sectional area for one shot of 0.5 $cm^2$ to 2 $cm^2$ is directed onto the moving article whereby after the impingement of the beam on the article there will remain the image obtained by the evaporation of a surface layer of the material and thus result well differentiated traces. The laser ray acts on the article via the metal mask with its photolithographically reproduced image (e.g. portrait, landscape, fine decoration) by means of a raster carrying structure of the "check" or "point" type with a resolution of 5 to 150 lines per cm.

The contact raster structure is exposed on the photoresist prior to the photopattern with the image. After the development, etching is effecting until perforation of the foil occurs in order to obtain the mask.

In some cases the raster structure can be obtained by fastening a metal grid forming the raster on a non-rastered metal mask. The movement of the item and the radiation frequency of the laser is combined in order to achieve overlapping of areas from 5 to 80% depending on the necessary contrasting of the image.

The apparatus of the invention for laser decoration comprises a base which has a console or upright mounted thereon and upon which are fastened parallel elements and a screw that is rotatable at its upper end in a thrust element and at its lower end is articulated with an electric motor.

A nut moving on the screw is fastened to a fork by a bracket guided along the parallel elements.

To the fork through handles and a fixator is attached a slide with longitudinal channels and a plate mounted for inclination at increments of 15°. On the slide is fastened a second electric motor on the axis of which is mounted a rotating carrier on which is placed the mask on which is put in a fixed manner the article to be decorated.

On the rotating bearer is mounted a contact lamella which in determined moments contacts with limiting contactors having the possibility to move along a ring that is fixed to the slide.

On the back side of the console is mounted a line on which are fixed a pair of limiting contactors that are contacting at determined moments the contactor lamella that is fastened to the nut.

At the rear end of the base is mounted a screw. The entire device is inserted in a noise-tight casing in the front end of which is mounted a L-shaped sleeve to which by means of adjusting bolts and an O-ring is fastened a seat in which is disposed a spherical mirror that reflects and focuses the laser radiation toward the mask.

In the case in which the device is used to decorate the inner part of quasi-flat and flat items, the rotating bearer has a disk attached thereto on which are mounted four spokes with four radial runners and four springs. On the disk is placed a replaceable stand carrying the article and the mask.

The advantages of the method comprise all known advantages of the methods for decorative processing of glass, ceramics and articles made thereof and, in addition, high productivity with accessible and reliable equipment for reproducing repeatedly complicated images while solving the problem with the durability of the masks. This method permits an additional linking of the device for decorative processing to an automated multi-position conveyor needing only insignificant adaptations while the advantages of the device for laser decorating itself according to this invention include the possibility of operations in sector mode While decorating inner parts of articles having a quasi-flat or flat geometry.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
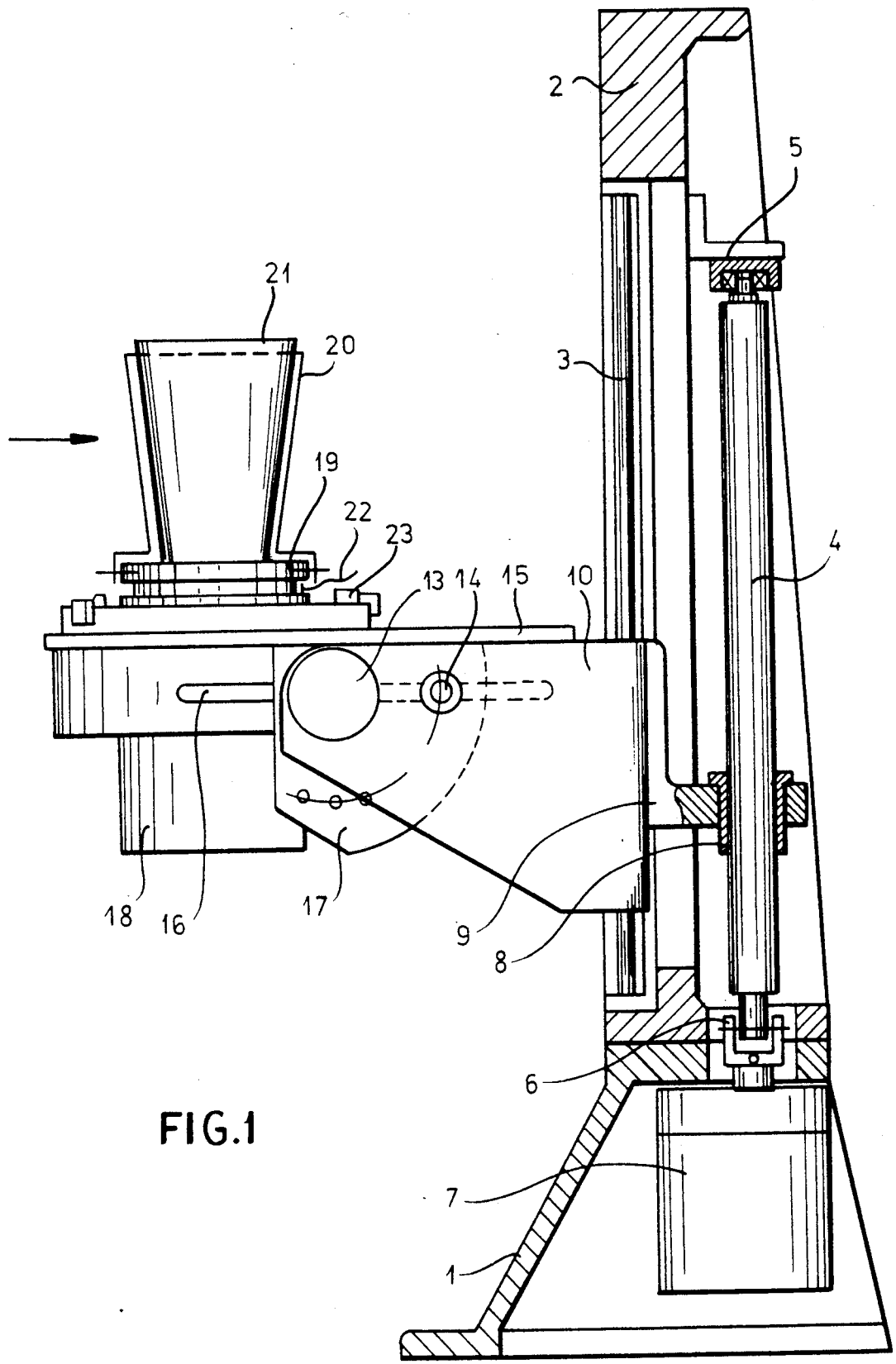
FIG. 1 is an elevational view partly in section of a device for laser decorating of articles with cylindrical symmetry.

The device for laser decorating (FIG. 1) comprises a base 1 with a console or upright 2 mounted thereon and on which are fastened parallel guide elements 3. A screw 4 is rotatable at its upper end in a thrust element or bearing 5 while in at its lower end it is connected by articulation 6 with an electric motor 7.

A nut 8 moving on screw 4 is connected by a bracket 9 to a fork 10 which is guided on the parallel elements 3.

On fork 10 a slide 15 is fastened by means of handle 13 and fixator (indexer) 14. The slide 15 has longitudinal channels 16 and a plate 17 for angular inclination at increments of 15°.

On slide 15 is fastened a second electric motor 18 on the axis of which is mounted a rotating carrier 19 on which is fastened the mask 20 in which is fixed the item 21 to be decorated. On the rotating bearer 19 is mounted a contact lamella 22 with contactors 23 which can be shifted.

Figure 2:
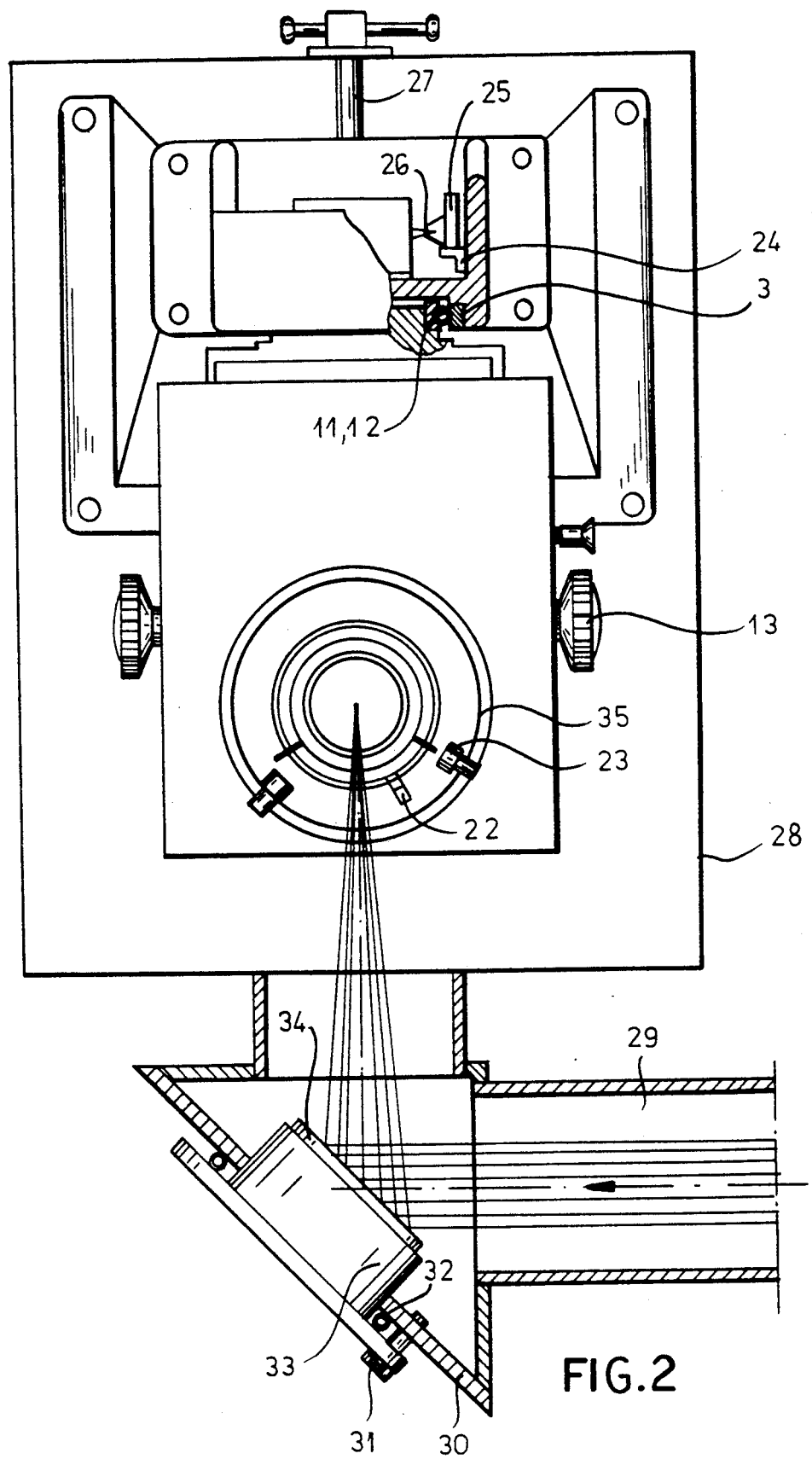
FIG. 2 is a view from above of the laser decorating device of FIG. 1.

As shown in FIG. 2 at the rear side of upright 2 is mounted a line 24 on which are fixed a pair of limiting contactors 25 which at determined moments engage contactor lamella 26 that is fastened to nut 8. At the rear side of base 1 is mounted a screw 27.

The entire device is mounted in a noise-tight casing 28 in the front end of which is mounted a L-shaped sleeve 29 and a plate 30. By means of adjusting bolts 31 and O-ring 32 a seat 33 is fixed to the plate 30. The seat 33 carries a spherical mirror 34 for reflecting and focusing of laser radiation onto mask 20.

Figure 3:
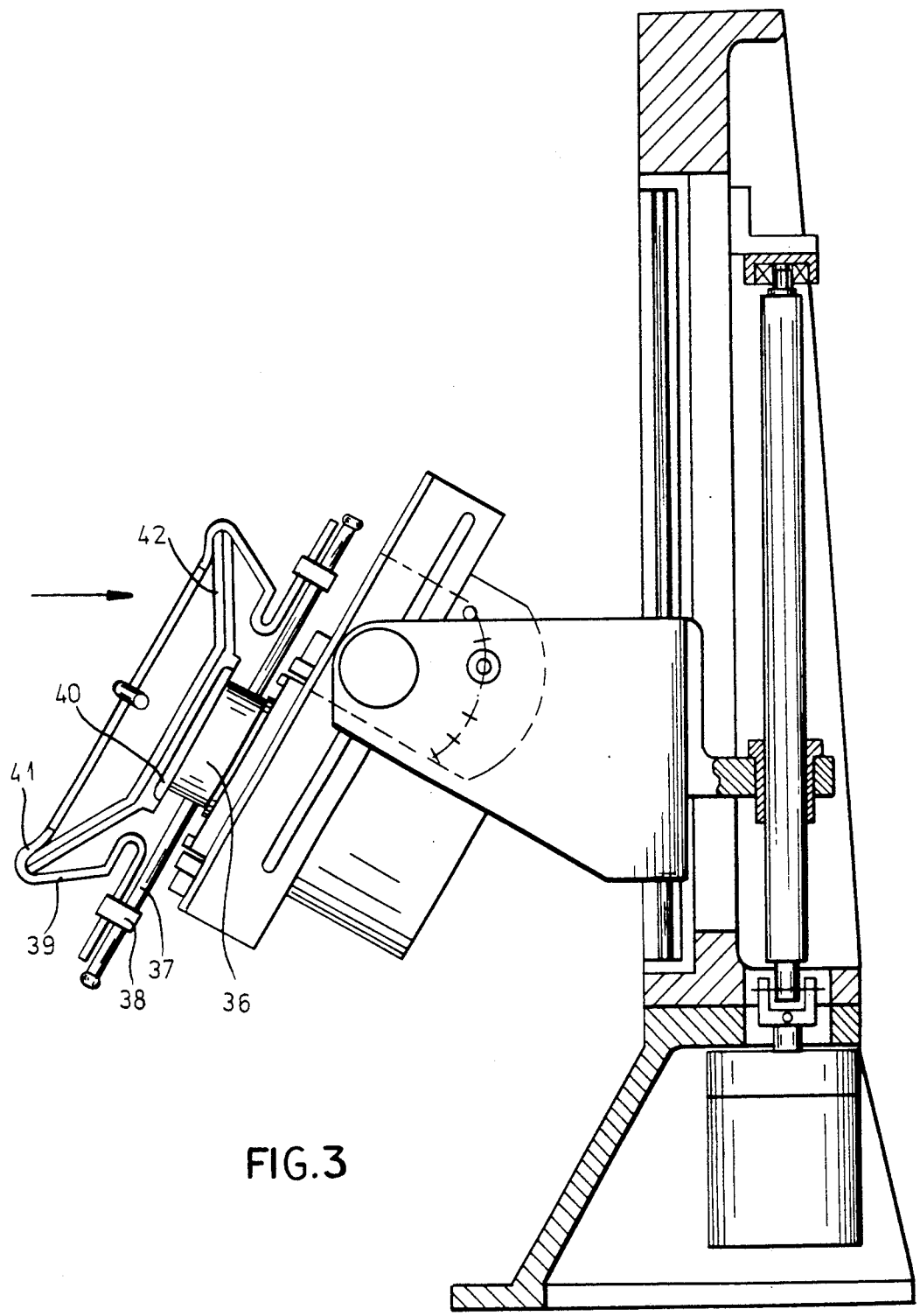
FIG. 3 is a longitudinal section through a device for laser decorating of articles with quasi-flat or flat geometry.

Ring 35 serves for implementing of the sector mode of operation. In the case in which the apparatus is used for decorating the inner parts of quasi-flat or flat articles (FIG. 3), a disk 36 is fastened on the rotating carrier 19. The disk 36 has four spokes 37 mounted thereon with four radial sliders 38 and four springs 39. On the disk 36 is placed a replaceable stand 40, the articles 41 and the mask 42.

The device for laser decorating is operated in the following manner:

During decorating the article 21 is placed in a fixed manner with respect to the mask 20 so that the laser radiation impinges perpendicularly to the surface of item 21 and mask 20 which are executing two simultaneous movements: vertical-translational or reciprocating and unidirectional or reversing rotatory movement.

The movement in sector is effected by both limiting contactors 23 which can take position at different sites on ring 35 whereby is determined the sector angle and they contact at determined moments with contact lamella 22 that is fastened to rotating carrier 19.

In case of decorating items with quasi-flat or flat geometry, the disk 40 is affixed to the carrier 19 with spokes 37 as a replaceable stand 40 according to the article 41.

On stand 40 is fixed item 41 and mask 42 by means of springs 39 moving along spokes 37. In order that the laser radiation falls perpendicularly to the surface of the item with quasi-flat or flat geometry, the slide 15 is rotated around the bolts of handle 13 and is fixed at the desired position by indexer 14 and then handle 13 is tightened. The indexing position of the angularly displaceable plate are spaced at increments of 15° and permit a precision of orthogonality with respect to laser radiation of 7°30.

Vertical-translational or reciprocating movement is initiated by electric motor 7 and by means of articulation 6 the rotatory movement is transmitted to screw 4. The rotatory movement is converted by nut 8 into rectilinear-translational movement of that through bracket 9 is transmitted to fork 10 and slide 15 which moves upwards or downwards along parallel elements 3.

The determining of the height of lifting or lowering of slide 15 is effected by the pair of limiting contactors 25 fastened to line 24 and the contact lamella 26 from which in case of contact with one of the limiting contactors 25 is generated an electrical signal for feedback and reversing of the movement of electric motor 7.

Unidirectional (or reversing) rotary movement is effected by the second electric motor 10 whereby its rotatory movement is transmitted to carrier 19 on which is fastened mask 20 in which and with respect to which is placed in a fixed manner the article 21.

The device for laser decorating is mounted in a noise-tight casing 28 in one end of which is fastened a L-shaped sleeve 29 through which is passing the laser radiation. The collimated laser radiation beam coming from the laser reaches the concave spheric mirror 34 that is mounted in seat 33 at an angle of 45° with respect to the incident beam and is reflected by it to be focused at an angle 90° to the item to be decorated—21 or 41. By means of the three adjusting bolts 31 disposed at 120° one with respect to the other and the rubber O-ring 32 placed between seat 33 and plate 30 it is possible to tune the mirror 34 in a determined range. In order that the item is at the most favorable distance for engraving with respect to the focus of mirror 34 the slide 15 is approached or moved away along the channel 16 or the entire device is displaced by the screw 27.

In decorative processing of glasses the repetitively pulsed transversal discharge at atmospheric pressure—(RP TEA) $CO_2$-laser has the following parameters after operational tuning: pulse energy 5 J, power density in zone of action $1.10^7 W/cm^2$, pulse duration 70 ns, repetition frequency 15 Hz and average power 50W.

In decorative processing of porcelain cups by repetitively pulsed transversal discharge at atmospheric pressure the—(RP TEA) $CO_2$-laser is operated with the following parameters: pulse energy 5 J, power density $3.10^7 W/cm^2$, pulse duration 50 ns, repetition frequency—20 Hz, average power 100 W.

We claim:

1. An apparatus for decorating a glass or ceramic article which comprises:
   a base;
   an upright on said base;
   vertical guide elements extending vertically parallel to each other on said upright;
   a screw on said upright journaled at an upper end of said upright in a thrust element bearing;
   a first electric motor in said base and connected by an articulation to the lower end of said screw for driving said screw;
   a nut threadedly engaging said screw and displaceable vertically along said screw by rotation of said screw;
   a bracket guided vertically on said guide elements and connected to said nut for vertical displacement together with said nut, by said screw upon energization of said first motor to rotate said screw,
   a fork connected to said bracket;
   a plate slidably and rotationally connected to said fork, said plate being formed with a longitudinal slot and displaceable on said fork toward and away from said upright;
   means between said plate and said fork for angularly rotationally indexing said plate at inclination increments of 15° to the vertical and for locking said plate at an indexed increment relative to said fork;
   a second electric motor, said motor being mounted to said plate;
   means for mounting said article to be decorated on said plate for rotation about an axis of said second motor by said second motor;
   a polished metal mask mounted on said plate in fixed juxtaposition with the location of said article when said article is mounted and consisting of a metal foil with a thickness of 0.1 to 0.9 mm and a photolithographically reproduced throughgoing image across which a raster capable of a resolution of 5 to 150 lines/cm is provided, wherein said mask will be rotated with said article by said second electric motor;
   contactor means for controlling said second electric motor for displacing said article and said mask in a sector-wise manner on said plate over a predetermined sector angle;
   a noise-excluding housing enclosing said base, said upright, said fork and said plate;
   a right angle guide tube connected to said housing for training a laser beam through said mask onto said surface;
   a spherical mirror positioned in said right angle tube for reflecting a laser beam trained through said mask onto the surface of said article; and
   a repetitively-pulsed atmospheric pressure $CO_2$ laser with a pulse energy of 1 to 5 J, a power density of $1 \times 10^6 W/cm^2$ to $6 \times 10^7 W/cm^2$, a pulse duration of 50 to 100 ns and an average power of 1 to 1000 W, said laser being positioned to generate said laser beam trained through said tube and expose said surface to said laser beam over a single shot area of 0.5 to 2 $cm^2$.

2. The apparatus defined in claim 1 wherein said second motor is connected to a rotatable carrier on which a disk is mounted, said disk having four spokes attached to four springs and receiving a replaceable stand for said article.

* * * * *